(12) United States Patent
Engle

(10) Patent No.: US 10,674,306 B2
(45) Date of Patent: Jun. 2, 2020

(54) LOCATION INFORMATION THROUGH DIRECTIONAL SOUND PROVIDED BY MOBILE COMPUTING DEVICE

(71) Applicant: GM GLOBAL TECHNOLOGY OPERATIONS LLC, Detroit, MI (US)

(72) Inventor: Stephanie Olivia Engle, San Francisco, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 16/103,067

(22) Filed: Aug. 14, 2018

(65) Prior Publication Data

US 2020/0059747 A1    Feb. 20, 2020

(51) Int. Cl.
*H04S 7/00* (2006.01)
*H04W 4/30* (2018.01)
*H04S 5/00* (2006.01)
*H04R 1/40* (2006.01)

(52) U.S. Cl.
CPC ............... *H04S 7/303* (2013.01); *H04R 1/40* (2013.01); *H04S 5/005* (2013.01); *H04W 4/30* (2018.02); *H04R 2201/401* (2013.01); *H04S 2400/11* (2013.01)

(58) Field of Classification Search
CPC ............. G01C 21/3629; H04S 2420/01; H04S 2400/11; H04S 7/30; H04S 7/302; H04S 7/303; H04R 2430/20; H04R 2499/13
USPC ...... 381/17, 309, 74, 86; 701/441, 428, 431, 701/468
See application file for complete search history.

(56) References Cited

U.S. PATENT DOCUMENTS

| | | | |
|---|---|---|---|
| 9,268,471 B2 | 2/2016 | Na et al. | |
| 9,729,993 B2 | 8/2017 | Vilermo et al. | |
| 9,936,292 B2 | 4/2018 | Virolainen et al. | |
| 2008/0032663 A1* | 2/2008 | Doyle | H04H 20/106 455/345 |
| 2008/0046174 A1* | 2/2008 | Johnson | G01C 21/28 701/533 |
| 2008/0215239 A1* | 9/2008 | Lee | G01C 21/3629 701/441 |
| 2009/0079591 A1* | 3/2009 | Motoyama | G08G 1/205 340/991 |
| 2011/0276264 A1* | 11/2011 | Plocher | G01C 21/20 701/533 |
| 2014/0058662 A1* | 2/2014 | Tachibana | G01C 21/00 701/428 |
| 2015/0018038 A1* | 1/2015 | Na | H04M 1/035 455/556.1 |
| 2016/0134336 A1 | 5/2016 | Persson | |

* cited by examiner

*Primary Examiner* — Norman Yu
(74) *Attorney, Agent, or Firm* — Medley, Behrens & Lewis, LLC

(57) ABSTRACT

A mobile computing device that provides location information through directional sound is described herein. The mobile computing device includes a location detection system that provides location signals corresponding to a user location and a destination location, such as a vehicle location or a vertex of a predefined travel route, to a spatial audio generation system to define a spatial audio signal based on a direction from the user location to the destination location. The spatial audio signal is provided to an audio device of the mobile computing device that outputs the spatial audio signal as directional sound having a locus at the destination location.

20 Claims, 7 Drawing Sheets ns (GPS) are often used to
LOCATION INFORMATION THROUGH DIRECTIONAL SOUND PROVIDED BY MOBILE COMPUTING DEVICE

BACKGROUND

Mobile computing devices such as smart phones, tablets, and global positioning systems (GPS) are often used to generate location information for a user, which is thereby relied upon to facilitate navigation from one location to another. Location information may be paired by mobile computing devices with specific directions that are accessible in both visual and/or audio form (e.g., maps, moving graphics, images, lists of written directions/instructions, vocal commands, etc.) to guide the user to his or her desired location.

Directions that are paired with location information by a mobile computing device for location tracking purposes are particularly advantageous to individuals who suffer from certain forms of impairment, such as blindness, dementia, or intoxication, in addition to individuals who are generally unaware of (or who have forgotten) how to navigate to a particular location. The directions generated by mobile computing devices, however, are usually provided as discrete instructions. For visually impaired users, in particular, discrete audible commands such as "turn left" or "continue across the intersection" can be problematic because such commands offer no sense of degree as to how far left the individual should turn or how wide the intersection may be. Instead, the user must rely on external cues to fill in missing informational gaps that exist between directional prompts provided by the mobile computing device and the user's presently detected location.

In the case of visually impaired users, the external cues may include reliance upon directional sound that is perceived external to an audio system of the mobile computing device. In other words, visually impaired users rely upon sound waves sensed by their own ears to gage a distance and direction to a sound emitting source. While the process of interpreting directional sound is something that most people subconsciously perform on a regular basis, it is of paramount importance for the daily navigation of the visually impaired. Thus, a mobile computing device that provides discrete navigational information becomes problematic when a visually impaired person's situational awareness is further reduced, for example, by headphones of the mobile computing device that not only limit the perception of directional sound by physically blocking the introduction of external sound waves into the ear of the user but also fail to electronically generate directional sound waves that would further supplement the navigation process.

SUMMARY

The following is a brief summary of subject matter that is described in greater detail herein. This summary is not intended to be limiting as to the scope of the claims.

Described herein are various technologies pertaining to providing location information through directional sound. With more specificity, described herein are various technologies pertaining to a mobile computing device that includes an audio device which outputs directional sound to guide a user to a desired location. With still more specificity, described herein is a mobile computing device that generates location signals corresponding to a user location and a desired destination to define a spatial audio signal that is based on a direction from the user's location to the desired destination. The spatial audio signal is then conveyed to the user by the audio device as a directional sound wave. The desired destination of the user may, for example, include the location of a vehicle (e.g., an autonomous vehicle or a chauffeured vehicle) or it may include the location of a destination that is desirable for the user to locate upon exiting a vehicle (e.g., an entrance to a shopping center, the user's place of employment, or the user's home).

In order to generate directional sound waves by an audio device, the output of the sound waves is aimed at a particular directional field, rather than naturally distributing the sound according to traditional sound engineering principles. Artificially generated directional sound is intended to replicate the way in which sound is perceived in real life by the human ear in order to provide a three-dimensional sense of awareness to the listener. That is, directional sound waves generated by an audio device provide the user with a sense of direction and distance to a perceived sound emitting source in accordance with a user's general familiarity with directional sound in everyday life.

In an exemplary embodiment, a mobile computing device may indicate the location of a vehicle through directional sound. For instance, the mobile computing device may be a smart phone having an application/routine stored thereon that is initiated by a user when assistance is needed by the user to locate the vehicle. Directional sound waves are generated by an audio device (e.g., headphones linked to the mobile computing device) such that a locus of the perceived sound waves represents the location of the vehicle/desired destination.

An intensity/volume of the generated sound waves is additionally based on a current distance from the user's location to the vehicle location. A location detection system incorporated in the mobile computing device detects the location of the smart phone (e.g., through a local GPS) in proximity to the user as well as the location of the vehicle. The vehicle location may be detected based on reference points or coordinates previously stored in memory on the mobile computing device (e.g., at the time the vehicle was last parked by duplicating the coordinates of a mobile computing device while it was located therein) or by linking the mobile computing device to a location detection system incorporated in the vehicle itself that provides the location coordinates of the vehicle directly to the mobile computing system.

Once the locations of the mobile computing device and the vehicle are determined, a spatial audio signal is generated by the mobile computing device that represents a directional sound having a locus at the vehicle's location. The direction of the generated sound waves is further based on a current orientation/direction of the user from the user location to the vehicle location. The mobile computing device may determine the direction to a desired destination location based on an orientation of the headphones worn by the user and comparing the orientation to the user's present location or by tracking the user's trajectory and manipulating the directional sound waves in accordance therewith.

Since the locus of the directional sound output by the audio device corresponds to a static location, the user is able to audibly perceive whether he or she is moving closer to the vehicle, straying farther away, or oriented in the correct direction to locate the vehicle. While the techniques set forth herein may be suited for locating objects ranging from a 50 ft. radius to 1-2 blocks away, it is to be appreciated that there is no limit as to the distance at which these techniques can be used, since the source of the sound waves is generated locally by an audio device (i.e., headphones) and is not being emitted from the actual location of the vehicle, which could only produce audible sounds from a finite distance away.

While the foregoing exemplary embodiment describes navigation from a user location to a vehicle location, it is to be understood that the techniques described herein can use direction and distance to facilitate navigation from the user location to any number of desirable destination locations, including navigation from a user location that is proximate to a vehicle to another desired destination location away from the vehicle, or from one location to another where neither destination involves a vehicle.

The directional sound waves output by the audio device may further include effects such as a continuous tone, a beeping sound, music, or vocal phrases. For instance, the rate of a beeping sound may become more rapid as the mobile computing device approaches the destination location, whereas a continuous tone may be increased in volume as the destination location is approached. In some cases, non-spatial audio such as discrete vocal commands are layered with spatial audio to supplement the location information provided through directional sound. In other cases, the vocal commands themselves may be manipulated to output as spatial audio when the content of a cue (e.g., turn left/right) is played. In still other cases, a cue may be played in one ear or the other to indicate, for example, that a user needs to adjust their direction/orientation or that a user may be straying too far off course from their desired destination.

Additionally, the mobile computing device includes a system for converting two-dimensional stereo audio into a three-dimensional binaural (left and right) format. Thus, a user that is listening to music when the navigation process is initiated can have the file converted in such a way that their music continues to play as directional sound with a locus at their intended destination. Alternatively, the user could adjust the settings of the mobile computing device to indicate a preference that preprogrammed music should be played to provide the above effect when the navigation process is initiated.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
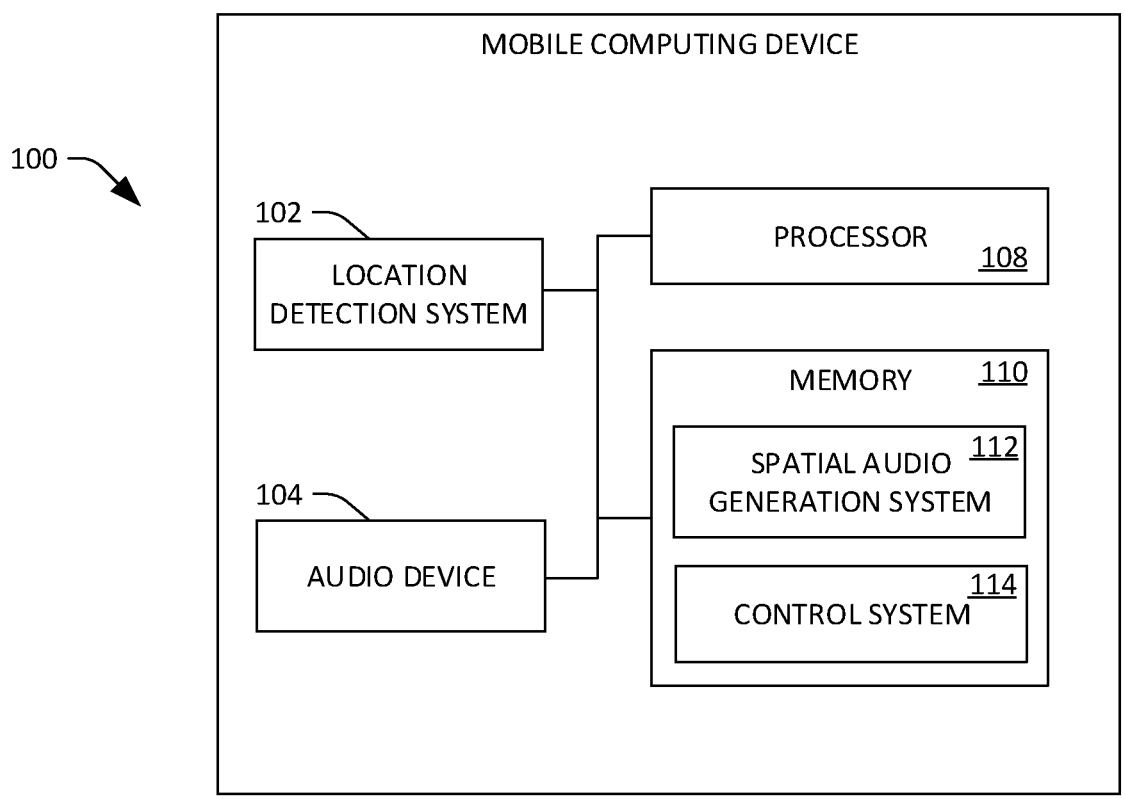
FIG. 1 illustrates an exemplary mobile computing device.

Various technologies pertaining to providing location information by a mobile computing device through directional sound are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean serving as an illustration or example of something and is not intended to indicate a preference.

With reference now to FIG. 1, an exemplary mobile computing device 100 is illustrated. The mobile computing device 100 may be any portable device such as a cell phone, smart phone, tablet, wearable device, or other electronic device that is configured to process location signals and thereby generate direction information suitable for navigation. The generated information may include spatial audio waves as well as visual information such as maps, moving graphics, images, lists of written directions/instructions, etc. The mobile computing device 100 may further include a routine stored on memory 110 in the mobile computing device 100 that is initiated by a user of the device when navigational assistance is desired.

The mobile computing device 100 includes a location detection system 102 that generates location signals. The location detection system 102 is configured to identify the location of the mobile computing device 100, for example, through GPS coordinates. The mobile computing device 100 may have a built-in GPS (e.g., the location detection system 102 can be a GPS receiver) or the location detection system 102 may receive a signal from an external system that captures the location of the mobile computing device 100 and/or the location of another object such as a vehicle. In an exemplary embodiment, the location detection system 102 of the mobile computing device 100 is linked to a second location detection system of a vehicle (e.g., an autonomous vehicle) which transmits second location information of the vehicle to the location detection system 102 of the mobile computing device 100.

In cases where the location of a static object (e.g., a building or a parked car) is not transmitted to the location detection system 102 by an external system, the coordinates of the static object may be determined by other methods. For example, the coordinates of a parked car may be stored on memory 110 in the mobile computing device 100 by preserving the coordinates of the mobile computing device 100 while the device 100 was located inside of (or proximate to) the car at the time it was parked. This information is then referenced at a subsequent time in order to navigate from the user's currently detected location to the previously saved coordinates corresponding to the vehicle. In other instances when navigation to non-movable object such as a building is desired, coordinate data may be extracted from online maps and other networks that the mobile computing device 100 is in communication with and provided to the location detection system 102.

The mobile computing device 100 additionally comprises a processor 108 and memory 110 which are in communication with the location detection system 102 and an audio device 104. The memory 110 includes computer-executable instructions which are executed by the processor 108.

The location detection system 102 generates location signals corresponding to the location of the user (e.g., the location of the mobile computing device 100 can be assumed to be the location of the user) and a desired destination location, and provides the location signals to the memory 110, where they are further received by a spatial audio generation system 112. The spatial audio generation system 112 is configured to generate a spatial audio signal that corresponds to a direction from the user's location to the desired destination. The memory 110 additionally includes a control system 114 that is configured to receive an output of the spatial audio generation system 112 and is further configured to control an output of the audio device 104 based upon the spatial audio signal generated by the spatial audio generation system 112 and other parameters.

In a preferred embodiment, the audio device 104 is headphones linked to the mobile computing device 100. However, the audio device 104 may also be a speaker array incorporated in the mobile computing device 100 or disposed at an external position. Thus, while the audio device 104 is depicted in FIG. 1 as being included in the mobile computing device 100, it is contemplated that the audio device 104 may be separate from the mobile computing device 100 (e.g., the audio device 104 and the mobile computing device 100 can be coupled to each other).

Figure 2:
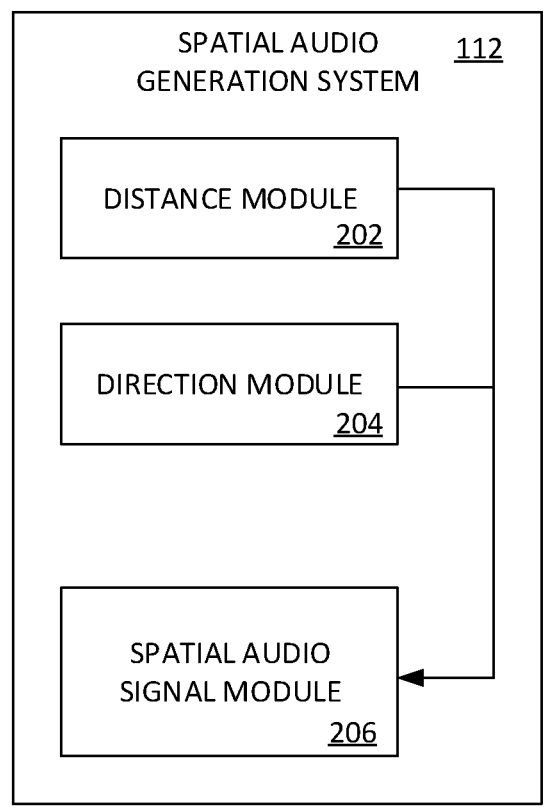
FIG. 2 illustrates an exemplary spatial audio generation system for defining a spatial audio signal.

With reference now to FIG. 2, the spatial audio generation system 112 includes a distance module 202, a direction module 204, and a spatial audio signal module 206. The location detection system 102 generally provides two location signals to the spatial audio generation system 112. A first location signal captures the location of a desired destination. For instance, the first location signal may capture the location of a vehicle or it may capture the location of some other destination of interest, such as an entrance to a building. The second location signal captures the current location of the user by correlating the detected location of the mobile computing device 100 to the location of the user.

The first location signal and the second location signal do not need to be received by the spatial audio generation system 112 in any particular order. The spatial audio generation system 112 is configured to accumulate data output by the location detection system 102 as it is received. In instances where the user location is changing, updated user location signals are provided to the spatial audio generation system 112 based on detected changes in the user's location. The spatial audio generation system 112 may provide the updated user location signal to at least one of the distance module 202 or the direction module 204 as a replacement signal for the prior user location signal or it may accumulate the signals to determine a trajectory of the user.

The distance module 202 receives the first location signal and the second location signal to determine a distance between the two locations based on coordinates captured in the respective location signals for each location. The distance between the two locations may be used to define an intensity of a spatial audio signal by the spatial audio signal module 206. For example, a short distance between the two detected locations can result in generating a spatial audio signal that corresponds to a loud/intense output by the audio device 104, whereas a large distance between the two detected locations can correspond to a quieter/moderate output by the audio device 104.

The direction module 204 further receives the first location signal and the second location signal to determine a direction from the user location to a desired destination. There are at least two methods that the direction module 204 can implement to define direction. First, the direction module 204 may receive a signal that captures the orientation of the user. For example, the audio device 104 may be a pair of headphones linked to the mobile computing device 100 that detects which direction the user's head is oriented while wearing the headphones, so that a suitable spatial audio signal can be defined by the spatial audio signal module 206. The direction that the user is facing may also be detected by the orientation in which the mobile computing device 100 is being held. Second, the direction module 204 may define a direction based on detected motion of the user. For instance, the direction module 204 may compare the coordinates captured in an updated user location signal with the coordinates captured in a previous location signal to determine a direction that the user is walking.

The outputs from each of the distance module 202 and the direction module 204 are provided to the spatial audio signal module 206 for spatial audio signal generation. In particular, the spatial audio signal is generated by the spatial audio signal module 206 so that it defines a directional sound having a perceived locus emitted by the audio device that corresponds to a destination location. The locus includes a directional component that is defined based on the output of the direction module 204 and a distance component that is defined based on the output of the distance module 206.

Figure 3:
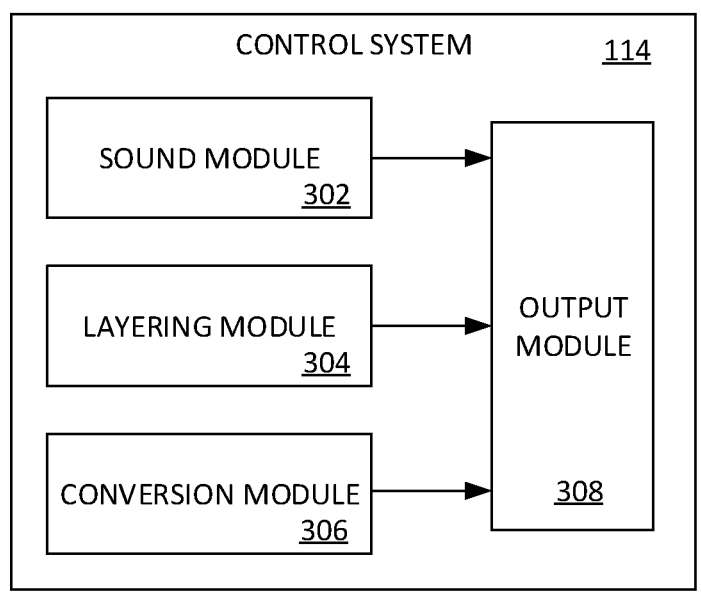
FIG. 3 illustrates an exemplary control system for controlling the output of an audio device.

With reference now to FIG. 3, the control system 114 includes a sound module 302, a layering module 304, and a conversion module 306. Each module 302-306 provides a signal to an output module 308 that, when executed by the processor 108, controls the output of the audio device 104. Directional sound emitted by the audio device 104 may comprise any of a continuous tone, a beeping sound, music, and vocal phrases/commands, amongst others, which are typically predefined sounds stored in the sound module 302. In an exemplary embodiment, a sub-routine running on the mobile computing device 100 is accessed by the user to maintain control over the type of signal generated by the sound module 302. For example, the user is able to indicate a preference as to which type of sound (e.g., continuous tone, beeping sound, etc.) he or she would like to have output by the audio device 104 during navigation.

In some embodiments, discrete commands (e.g., turn right) are output by the audio device 104 in addition to directional sound waves. Discrete, non-spatial audio supplements the spatial sound waves emitted by the audio device 104 by providing an additional level of situational awareness that facilitates navigation by the user. The layering module 304 layers non-spatial audio signals provided to the control system 114 with the spatial audio signals generated by the spatial audio generation system 112. The resulting signal provides simultaneous output of spatial and non-spatial audio that is distinguishable to the user (i.e., the user is able to differentiate between the directional sound and non-spatial audio cues). Alternatively, the layering module 304 may use the content of a cue itself as the directional sound perceived by the listener. For instance, the cue may say "turn left" or "turn right" but is output by the audio device 104 as spatial audio as well.

In another exemplary embodiment, the conversion module 306 is used to convert two-dimensional stereo audio into a three-dimensional binaural format. Specifically, the mobile computing device 100 may store a particular piece of music or other type of multimedia audio file that that user would prefer to listen to over the predefined sounds already incorporated in the sound module 302. When this preference is initiated, the audio file is provided to the conversion module 306, which converts the two-dimensional audio into spatial audio so that when the file plays it is output as directional sound by the audio device 104 having a perceived locus at the destination location. In addition, if the user is already streaming an audio file at the time that navigation is initiated, the signal may be fed through the conversion module 306 to output the streamed data as directional sound for navigation. Upon receiving one or more control signals from the sound module 302, the layering module 304, and/or the conversion module 306, the output module 308 generates a consolidated output signal for the audio device 104 that captures the information provided by each module 302-306 to generate a combined sound.

Figure 4:
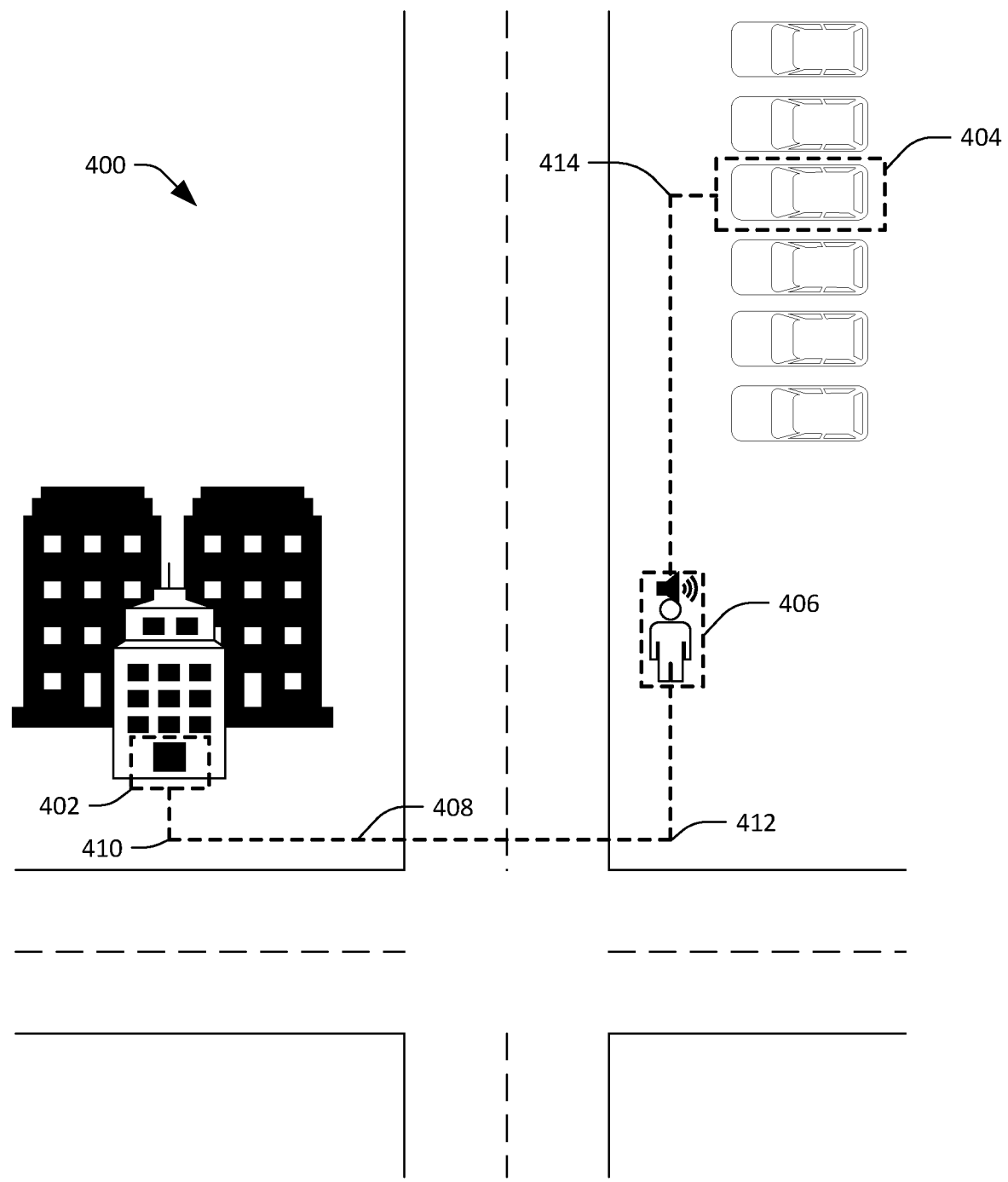
FIG. 4 illustrates an example of a user of a mobile computing device navigating from a first location to a second location using directional sound.

With reference now to FIG. 4, a diagram 400 illustrates an example of a mobile computing device user navigating along a travel path 408 from a first location to a second location based on directional sound. The diagram 400 includes a building location 402, a user location 406, and a vehicle location 404. The same travel path 408 that is used to navigate from the vehicle location 404 to the building location 402 may be used for return navigation from the building location 402 to the vehicle location 404. Accordingly, it is to be understood that both directions of travel are represented by the diagram 400.

Additionally, the travel path 408 does not necessarily represent the travel direction that is indicated by the directional sound output from the audio device. For example, if the user is navigating from the building location 402 to the vehicle location 404, the directional sound perceived by the user will have a locus at the vehicle location 404. Thus, when navigation is initiated with the mobile computing device 100, the user location 406 and the building location 402 would have overlapping coordinates such that the directional sound output by the audio device would direct the user in a straight line from the building location 402 to the vehicle location 404, as if it were providing location information of the vehicle based on the shortest distance between two points. That is, as the user location 406 changes, one end of the straight line would remain fixed at the vehicle location 404 while the other end of the straight line would be fixed to the dynamic location of the user.

Since a straight-line navigation approach is not always practical, however, (e.g., when there is a need to follow a sidewalk or a need to use a cross walk when crossing a street) the user may rely on other cues to supplement navigation by directional sound such as discrete directions from the mobile computing device 100 or external cues to the mobile computing device 100. Users of the mobile computing device 100 are generally cognizant of the fact that navigating precisely in the direction of the perceived locus may not always be the safest or most desirable route to pursue and that implementation of a non-linear travel path may be more practical. The diagram 400 illustrates an exemplary non-linear travel path 408 that is supplemented by directional sound based on the user location 406.

Alternatively, the mobile computing device 100 may define the non-linear travel path 408 and further define a dynamic locus that changes its perceived location based on the coordinates of the user location 406 with respect to the vertices 410-412 in the travel path 408. For instance, if the user location 406 corresponds to the building location 402 when navigation is initiated, a locus of the directional sound output by the audio device may initially be defined at a first vertex 410 along the travel path 408. The user of the mobile computing device 100 follows the directional sound toward the first vertex 410. When the user location 406 corresponds to the coordinates of the first vertex 410, the locus is redefined at a second vertex 412 along the travel path 408. The user of the mobile computing device 100 again follows the directional sound toward the second vertex 412. When the user location 406 corresponds to the second vertex 412, the locus is further redefined at a third vertex 414 along the travel path 408. This process repeats for all of the vertices and an endpoint in the travel path until the user has arrived at their desired destination. It is to be understood that this process could be performed in reverse order to facilitate return navigation from the vehicle location 404 to an original starting point of the travel path 408.

Figure 5:
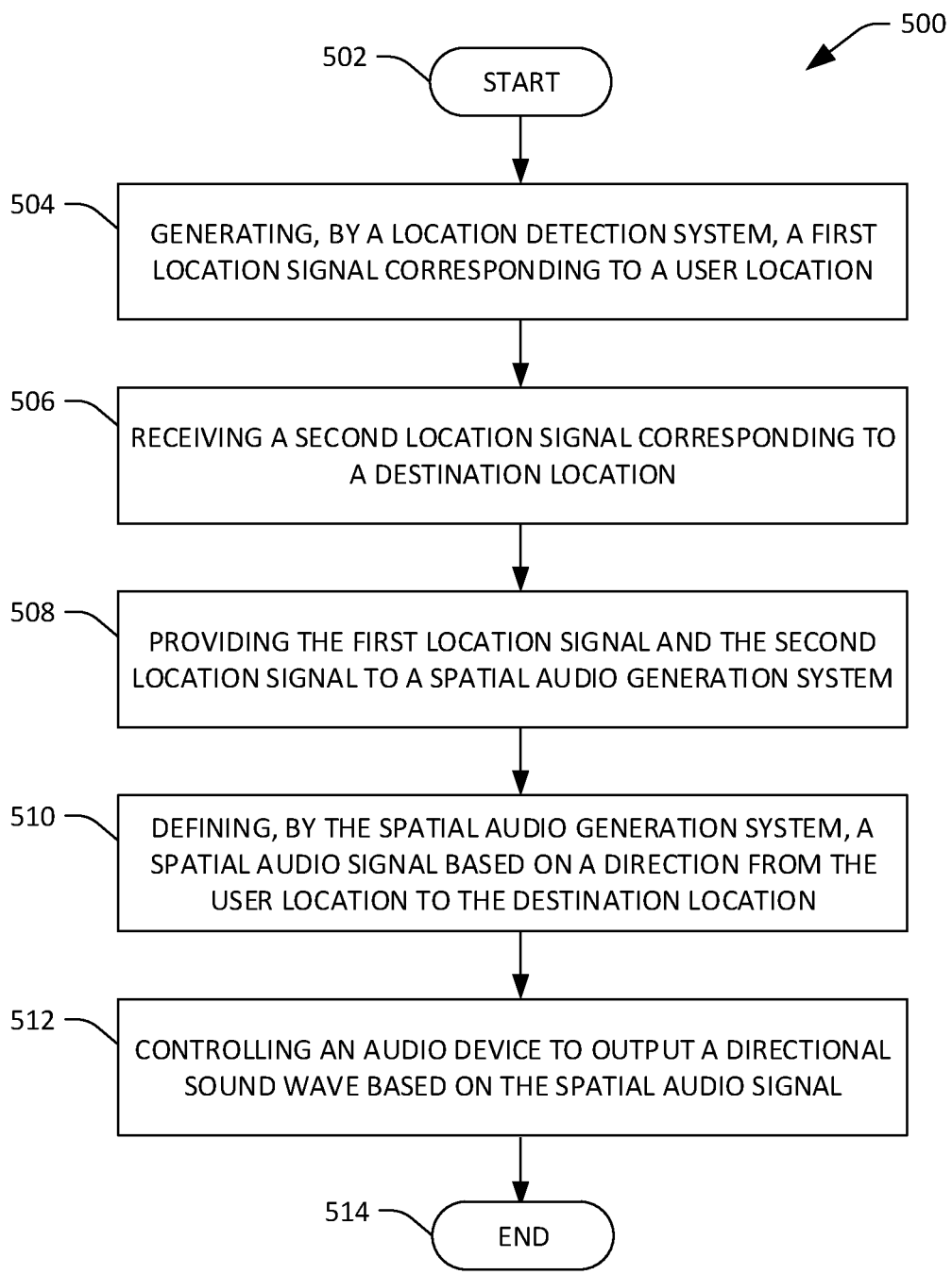
FIG. 5 is a flow diagram illustrating an exemplary methodology for providing location information through directional sound.
Figure 6:
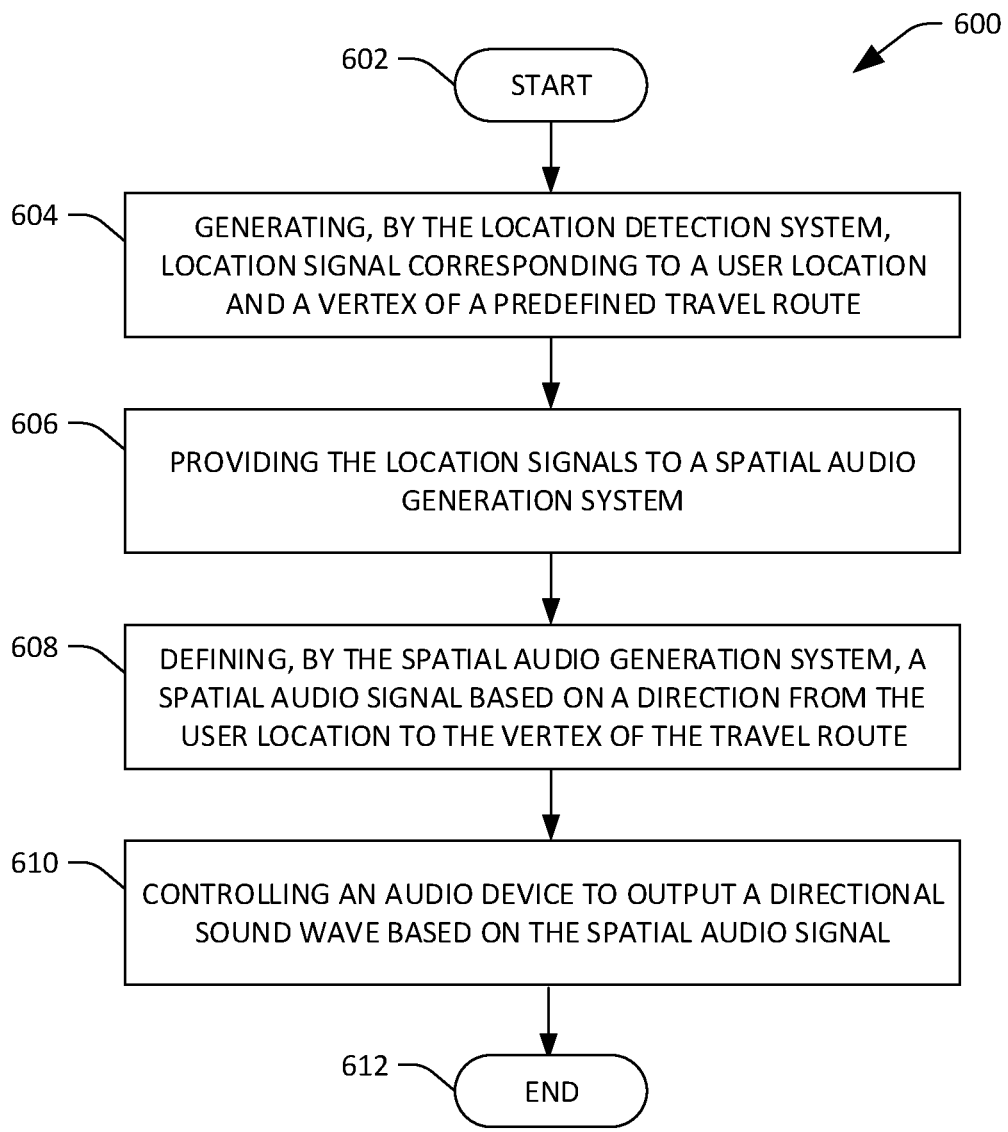
FIG. 6 is a flow diagram illustrating an exemplary methodology for providing location information through directional sound.

FIGS. 5 and 6 illustrate exemplary methodologies relating to providing location information by a mobile computing device through directional sound. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, an exemplary methodology 500 for providing location information through directional sound is illustrated. The methodology 500 starts at 502, and at 504 a first location signal is generated by a location detection system (e.g., a mobile computing device), wherein the first location signal corresponds to a user location (e.g., a location of the mobile computing device). At 506, a second location signal is received by the mobile computing device, wherein the second location signal corresponds to a destination location. At 508, the first location signal and the second location signal are provided to a spatial audio generation system. The spatial audio generation system is incorporated in memory on a mobile computing device. The memory is in communication with the location detection system, an audio device, and a processor. At 510, the spatial audio generation system defines a spatial audio signal based on a direction from the user location to the destination location. At 512, the audio device is controlled based on the spatial audio signal. The audio device outputs directional sound having a locus perceived by the user at the destination location. The methodology 500 completes at 514.

Referring now to FIG. 6, an exemplary methodology 600 for providing location information through directional sound is illustrated. The methodology 600 starts at 602, and at 604 location signals are generated by a location detection system that correspond to a user location and a vertex of a predefined travel route. The predefined travel route may be generated by the mobile computing device or defined based on an external source. At 606, the location signals are provided to a spatial audio generation system. The spatial audio generation system is incorporated in memory on a mobile computing device. The memory is in communication with the location detection system, an audio device, and a processor. At 608, the spatial audio generation system defines a spatial audio signal based on a direction from the user location to a vertex in the predefined travel route. For example, the direction may correspond to a particular segment of the travel route. At 610, the audio device is controlled based on the spatial audio signal. The audio device outputs directional sound having a locus perceived by the user at a vertex of the predefined travel route. The methodology 600 completes at 612.

Figure 7:
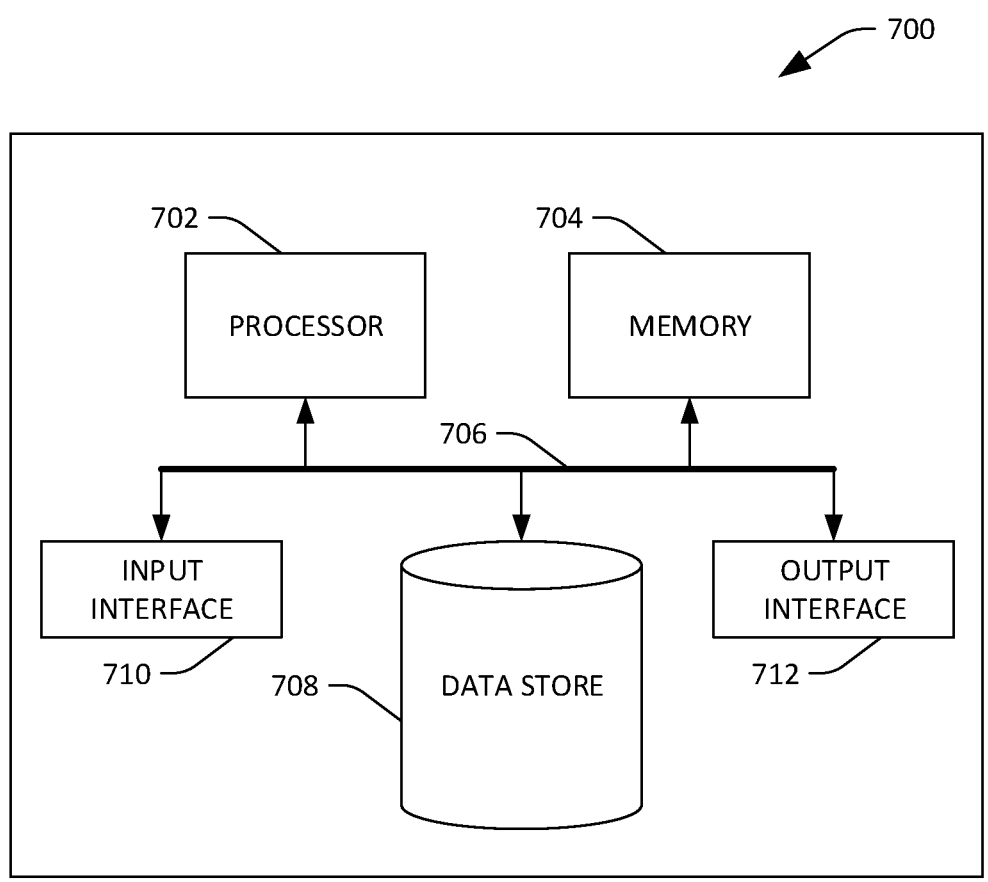
FIG. 7 illustrates an exemplary computing system.

Referring now to FIG. 7, a high-level illustration of an exemplary computing device 700 that can be used in accordance with the systems and methodologies disclosed herein is illustrated. For instance, the computing device 700 may be or include the mobile computing device 100. The computing device 700 includes at least one processor 702 that executes instructions that are stored in a memory 704. The instructions may be, for instance, instructions for implementing functionality described as being carried out by one or more modules and systems discussed above or instructions for implementing one or more of the methods described above. In addition to storing executable instructions, the memory 704 may also store location information, distance information, direction information, etc.

The computing device 700 additionally includes a data store 708 that is accessible by the processor 702 by way of the system bus 706. The data store 708 may include executable instructions, location information, distance information, direction information, etc. The computing device 700 also includes an input interface 710 that allows external devices to communicate with the computing device 700. For instance, the input interface 710 may be used to receive instructions from an external computer device, etc. The computing device 700 also includes an output interface 712 that interfaces the computing device 700 with one or more external devices. For example, the computing device 700 may transmit control signals to the audio device 104 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile computing device in communication with headphones configured to output a directional sound wave, the mobile device comprising:
   a processor; and
   memory that stores instructions that, when executed by the processor, cause the processor to perform acts comprising:

receiving data specifying a current user location, wherein the current user location corresponds to a location of the mobile computing device;

receiving data specifying a destination location to which the user is traveling;

detecting a direction of the user at the current user location relative to the destination location, wherein the direction of the user at the current user location relative to the destination location is detected at least in part based on an orientation of the headphones;

generating a spatial audio signal based on the direction of the user at the current user location relative to the destination location; and controlling the headphones to output the directional sound wave based on the spatial audio signal.

2. The mobile computing device of claim 1, wherein the destination location is a location of a vehicle that the user is traveling to meet.

3. The mobile computing device of claim 1, wherein controlling the headphones to output the directional sound wave based on the spatial audio signal further comprises controlling an intensity of the directional sound wave outputted by the headphones based on a distance from the current user location to the destination location.

4. The mobile computing device of claim 1, the acts further comprising:

receiving data from the headphones specifying the orientation of the headphones.

5. The mobile computing device of claim 1, wherein the directional sound wave comprises at least one of a continuous tone, a beeping sound, music, or a vocal phrase.

6. The mobile computing device of claim 1, the acts further comprising:

layering the spatial audio signal with a non-spatial audio signal to cause the headphones to simultaneously output the directional sound wave and a non-directional sound wave.

7. The mobile computing device of claim 1, wherein generating the spatial audio signal further comprises converting two-dimensional audio data into a three-dimensional format.

8. The mobile computing device of claim 1, wherein the mobile computing device is a smart phone linked to the headphones.

9. The mobile computing device of claim 1, wherein the data specifying the destination location to which the user is traveling is received from an autonomous vehicle.

10. A method performed by a mobile computing device in communication with headphones that output a directional sound wave, the method comprising:

receiving data specifying a current user location, wherein the current user location is a location of the mobile computing device;

receiving data specifying a destination location to which the user is traveling;

detecting a direction of the user at the current user location relative to the destination location, wherein the direction of the user at the current user location relative to the destination location is detected at least in part based on an orientation of the headphones;

generating a spatial audio signal based on the direction of the user at the current user location relative to the destination location; and controlling the headphones to output the directional sound wave based on the spatial audio signal.

11. The method of claim 10, wherein the destination location is a location of a vehicle to which the user is traveling.

12. The method of claim 10, further comprising controlling the headphones to change an intensity of the directional sound wave based on a distance from the current user location to the destination location.

13. The method of claim 10, further comprising:

receiving data from the headphones specifying the orientation of the headphones.

14. The method of claim 10, further comprising layering the spatial audio signal with a non-spatial audio signal to cause the headphones to simultaneously output the directional sound wave and a non-directional sound wave.

15. The method of claim 10, wherein generating the spatial audio signal further comprises converting two-dimensional audio data into a three-dimensional format.

16. The method of claim 10, wherein the data specifying the destination location to which the user is traveling is received from an autonomous vehicle.

17. A mobile computing device comprising:

a computer-readable storage medium that comprises instructions that, when executed by one of more processors, cause the one or more processors to perform actions comprising:

receiving data specifying a current user location, wherein the current user location corresponds to a location of the mobile computing device;

receiving data specifying a location of an autonomous vehicle to which the user is traveling;

detecting a direction of the user at the current location relative to the location of the autonomous vehicle to which the user is traveling, wherein the direction of the user at the current location relative to the location of the autonomous vehicle is detected at least in part based on an orientation of headphones in communication with the mobile computing device;

generating a spatial audio signal based on the direction of the user at the current user location relative to the location of the autonomous vehicle to which the user is traveling; and controlling the headphones to output a directional sound wave based on the spatial audio signal.

18. The mobile computing device of claim 1, wherein controlling the headphones to output the directional sound wave based on the spatial audio signal further comprises controlling a frequency of beeps included as part of the directional sound wave outputted by the headphones based on a distance from the current user location to the destination location.

19. The method of claim 10, further comprising controlling the headphones to change a frequency of beeps included as part of the directional sound wave outputted by the headphones based on a distance from the current user location to the destination location.

20. The mobile computing device of claim 17, wherein controlling the headphones to output the directional sound wave based on the spatial audio signal further comprises controlling a frequency of beeps included as part of the directional sound wave outputted by the headphones based on a distance from the current user location to the location of the autonomous vehicle.

* * * * *